US010508776B2

(12) United States Patent
Fang et al.

(10) Patent No.: US 10,508,776 B2
(45) Date of Patent: Dec. 17, 2019

(54) ANTI-DETACHMENT CAPPER FOR LED RETROFIT LAMPS

(71) Applicant: Current Lighting Solutions, LLC, East Cleveland, OH (US)

(72) Inventors: Min Fang, ShangHai (CN); Sheng Jiang, ShangHai (CN); Raghu Ramaiah, East Cleveland, OH (US); Qi Long, ShangHai (CN); Shuyi Qin, ShangHai (CN); Yong Li, ShangHai (CN)

(73) Assignee: CURRENT LIGHTING SOLUTIONS, LLC, East Cleveland, OH (US)

(*) Notice: Subject to any disclaimer, the term of this patent is extended or adjusted under 35 U.S.C. 154(b) by 0 days.

(21) Appl. No.: 15/373,707

(22) Filed: Dec. 9, 2016

(65) Prior Publication Data
US 2017/0307142 A1    Oct. 26, 2017

Related U.S. Application Data

(60) Provisional application No. 62/326,404, filed on Apr. 22, 2016.

(51) Int. Cl.
*F21K 9/235* (2016.01)
*B33Y 10/00* (2015.01)
(Continued)

(52) U.S. Cl.
CPC .............. *F21K 9/235* (2016.08); *B33Y 10/00* (2014.12); *B33Y 80/00* (2014.12); *F21K 9/23* (2016.08);
(Continued)

(58) Field of Classification Search
CPC ......... F21K 9/235; F21K 9/272; H01R 33/22; H01R 33/46; F21V 29/70
See application file for complete search history.

(56) References Cited

U.S. PATENT DOCUMENTS 5,997,354 A * 12/1999 Fulop ........................ H01J 5/56
313/318.01
2005/0174780 A1    8/2005 Park
(Continued)

FOREIGN PATENT DOCUMENTS

CN            2758588 Y       2/2006
CN          203880463 U      10/2014
(Continued)

OTHER PUBLICATIONS

PCT Search Report and Written Opinion issued in connection with corresponding PCT Application No. PCT/US2016/052579 dated Nov. 24, 2016.
(Continued)

*Primary Examiner* — Alexander K Garlen
(74) *Attorney, Agent, or Firm* — Buckley, Maschoff & Talwalkar LLC

(57) ABSTRACT

A bipartite capper component for an illuminating lamp includes a first portion formed of a first material and a second portion formed of a second material different from the first material. The second portion of the capper component is in contact with the first portion of the capper component. The first portion of the capper component is configured to threadedly engage within a standard threaded metal base component of the illuminating lamp.

14 Claims, 5 Drawing Sheets

(51) Int. Cl.

| | |
|---|---|
| *B33Y 80/00* | (2015.01) |
| *F21V 29/70* | (2015.01) |
| *F21K 9/238* | (2016.01) |
| *F21V 3/02* | (2006.01) |
| *F21V 19/00* | (2006.01) |
| *F21V 23/00* | (2015.01) |
| *F21V 23/06* | (2006.01) |
| *F21V 25/00* | (2006.01) |
| *F21K 9/23* | (2016.01) |
| *F21Y 115/10* | (2016.01) |

(52) U.S. Cl.
CPC .............. *F21K 9/238* (2016.08); *F21V 3/02* (2013.01); *F21V 19/006* (2013.01); *F21V 23/005* (2013.01); *F21V 23/06* (2013.01); *F21V 25/00* (2013.01); *F21V 29/70* (2015.01); *F21Y 2115/10* (2016.08)

(56) References Cited

U.S. PATENT DOCUMENTS

| | | | |
|---|---|---|---|
| 2009/0052175 A1 | 2/2009 | Xu et al. | |
| 2011/0089831 A1* | 4/2011 | Takahasi | F21S 8/026 315/35 |
| 2013/0100674 A1* | 4/2013 | Kim | F21V 21/00 362/249.14 |
| 2014/0104858 A1* | 4/2014 | Holland | B23P 15/26 362/369 |
| 2014/0168976 A1* | 6/2014 | Oki | F21V 3/0481 362/249.01 |
| 2014/0210333 A1* | 7/2014 | Kang | F21V 7/0016 313/46 |
| 2014/0240994 A1* | 8/2014 | Lim | F21V 3/0625 362/382 |
| 2014/0268826 A1 | 9/2014 | Pickard et al. | |
| 2014/0307443 A1 | 10/2014 | Clifford et al. | |
| 2014/0340870 A1 | 11/2014 | Premysler | |
| 2016/0037598 A1 | 2/2016 | Ramaiah et al. | |
| 2016/0131310 A1* | 5/2016 | Lu | F21V 23/06 362/362 |
| 2016/0131355 A1* | 5/2016 | Grajcar | F21V 23/006 362/234 |
| 2016/0262220 A1 | 9/2016 | Barnetson et al. | |
| 2016/0265727 A1 | 9/2016 | Akiyama et al. | |

FOREIGN PATENT DOCUMENTS

| | | |
|---|---|---|
| WO | 2012032951 A1 | 3/2012 |
| WO | 2013/009049 A2 | 1/2013 |
| WO | 2013038587 A1 | 3/2013 |
| WO | 2014/200960 A1 | 12/2014 |
| WO | 2015064181 A1 | 5/2015 |
| WO | 2015129420 A1 | 9/2015 |

OTHER PUBLICATIONS

Extended European Search Report and Opinion issued in connection with corresponding EP Application No. 17167270.2 dated Sep. 15, 2017.

Raghu, R., et al., Hid retrofit lamp with led light engines, GE co-pending U.S. Appl. No. 62/031,366, filed Jul. 31, 2014.

Raghu, R., et al., Led lamps for retrofit on high wattage metal halide ballasts, GE co-pending U.S. Appl. No. 62/087,099, filed Dec. 3, 2014.

Raghu, R., et al., LED Lamp Design for HID Retrofit, GE co-pending U.S. Appl. No. 62/221,400, filed Sep. 21, 2015.

* cited by examiner

ANTI-DETACHMENT CAPPER FOR LED RETROFIT LAMPS

CLAIM OF PRIORITY

This patent application claims the benefit of priority, under 35 U.S.C. § 119, of U.S. Provisional Patent Application Ser. No. 62/326,404, filed Apr. 22, 2016, titled "Anti-Detachment Capper for LED Retrofit Lamps," the entire disclosure of which is incorporated herein by reference.

BACKGROUND

A conventional HID (high intensity discharge) lamp is an arc-type lamp which produces light by forming an electric arc between electrodes housed in a fused alumina arc tube or transparent fused quartz filled with gas and metal salts. To achieve greater energy efficiency, it has been proposed to produce HID lamps that are retrofittable to conventional HID lamp holders but produce light via LEDs (light emitting diodes) instead of via an electric arc.

There have been reports of cases of arcing between an HID lamp base and the lampholder/socket in some field installations. The arcing may develop over time and may result in damage to the lamp. In some instances, the damage to the lamp may also result in a safety hazard.

In a proposed remedial response to the issue of arcing and damage to HID lamps, it has been recommended that high wattage HID lamps be used with mogul base lampholders that have center electrical contacts made of nickel plated copper alloy or stainless steel, with a supplemental coil spring to increase contact pressure and reduce the possibility of arcing. However, the recommended remedial response may be viewed as expensive, and may well not be implemented for a large proportion of existing installed lamp sockets.

DESCRIPTION

While the aspects of the disclosed embodiments are generally described herein with respect to an LED light source, the aspects of the disclosed embodiments apply to any suitable solid-state light source. As used herein, the term "solid-state light source" (or SSL source) includes, but is not limited to, light-emitting diodes (LEDs), organic light-emitting diodes (OLEDs), polymer light-emitting diodes (PLEDs), laser diodes, or lasers. In some implementations, the LEDs can be sealed from ambient air to prevent LED sulfuration. In addition, although the below description refers to LED light sources, it should be understood that other types of SSL sources could be utilized in some embodiments in accordance with the novel implementations described herein.

In accordance with embodiments, a capper component of the lamp may include a conductive portion for being threadedly engaged with a metal base of the lamp, and an insulative portion that electrically isolates the conductive portion of the capper component. It may be desirable for the capper component to have high thermal conductivity. With the conductive portion of the capper component engaged with the base, the lamp may resist damage and loss of structural integrity that could otherwise occur in cases of arcing. The retention of structural integrity promoted by the partially conductive capper component may aid in preventing the lamp from becoming a safety hazard.

Figure 1:
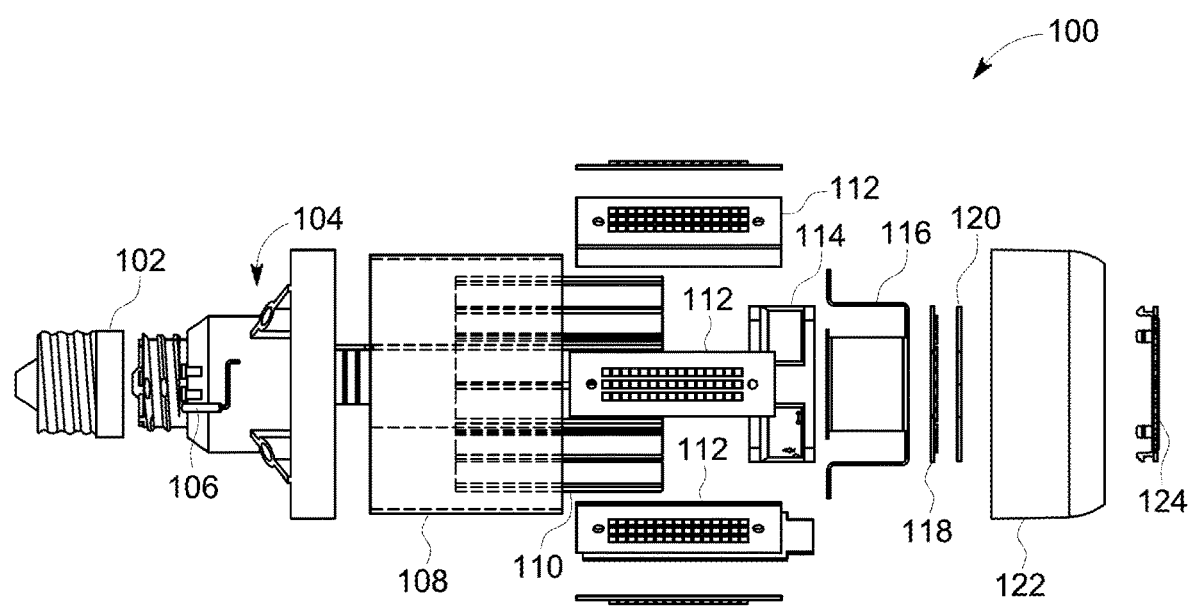
FIG. 1 is an exploded view of an LED retrofit lamp for an HID socket, as provided in accordance with an embodiment of the invention.

FIG. 1 is an exploded view of an LED retrofit lamp 100, as provided in accordance with an embodiment of the invention. The lamp 100 includes a metal base 102, which may be a so-called "mogul" base, and which is threadedly configured in accordance with conventional practices. The base 102 may be of a standard size and configuration to allow the lamp 100 to be installed in conventional lampholders/sockets.

The lamp 100 further includes a capper component 104. The capper component 104 is of particular relevance to the present disclosure, and will be described further below, including via discussion of FIGS. 2 and 3. The capper component 104 includes a safety bracket 106. The safety bracket 104 may serve as a built-in redundancy feature to help avoid safety hazards, by preventing the lamp from detaching from the lamp holder even in extraordinary circumstances such as defective socket installation or earthquake. The safety bracket may serve as an anchor for a tether cable (not shown) that can be attached to a rigid building support structure.

Continuing to refer to FIG. 1, the lamp 100 further includes a generally cylindrical plastic cover 108 and a heat sink 110. When the lamp 100 is in an assembled condition, the cover 108 may be in contact with the capper component 104 and the heat sink 110 may be at least partially disposed within the cover 108. When the lamp 100 is in an assembled condition, the cover 108 may be secured between the capper component 104 and a component 122 which is discussed below.

The lamp 100 still further includes a number of MCPCBs (metal core printed circuit boards, indicated by reference numeral 112). Not separately shown are LEDs mounted on the MCPCBs 112. When the lamp 100 is in an assembled condition, the MCPCBs 112 may be in thermally conductive contact with the heat sink 110. Also included in the lamp 100 are an active cooling device 114 (such as a fan), a dome bracket 116, a dome MCPCB 118, a dome MCPCB mask 120, a top capper 122 and a dome cover 124.

The overall form factor of the lamp 100 may conform with standards promulgated by the American National Standards Institute (ANSI), so that the lamp 100 can be installed in existing fixtures, both open and enclosed, for conventional HID lamps.

Power supply, electrical connections and circuitry for driving the LEDs mounted on the MCPCBs 112 may, for example, be provided in accordance with disclosure contained in U.S. Published Patent Application No. 2016/0262220 (which is commonly assigned herewith) and/or U.S. Published Patent Application No. 2016/0037598 (which is commonly assigned herewith and has a common inventor herewith). The circuit boards on which the LEDs are mounted may, in some embodiments, be of a type different from MCPCBs. The heat sink 110, if present, may be of any shape, including planar or cylindrical shapes. Features of the lamp 100 apart from the capper component 104 (and possibly also the heat sink 110) may be provided according to previous proposals for LED retrofit lamps.

Figure 2:
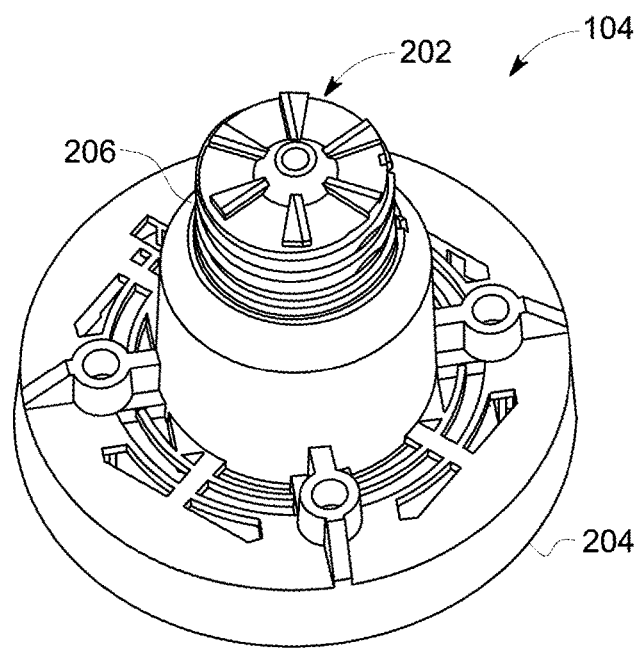
FIG. 2 is an isometric view of a capper component of the LED retrofit lamp of FIG. 1.

FIG. 2 is an isometric view of the capper component 104 as discussed above in connection with FIG. 1 and FIG. 3 is a sectional view of the capper component 104. The capper component 104 includes a conductive portion 202 and an insulative portion 204. An exposed section 206 of the conductive portion 202 is configured with threads in such a manner that the base 102 can be screwed on to the exposed section 206 of the conductive portion 202. A insulated section 208 (FIG. 3) of the conductive portion 202 may be integrally formed with the exposed section 206 and may be embedded in the insulative portion 204 of the capper component 104. It will be appreciated that the conductive portion 202 and the insulative portion 204 may be formed of different materials from each other. For example, the conductive portion 202 may be formed of aluminum or any other metal (such as copper, magnesium, titanium, zinc, steel, iron, nickel, coated iron), metal alloy (e.g., bronze or brass or copper alloys) or metallic compound, or a metal matrix composite of a kind that has a relatively high melting point and good mechanical strength. It may be advantageous for the material of which the conductive portion is composed to have good manufacturability. Among possible materials for constituting the conductive portion 202 are any refractory metal such as stainless steel, molybdenum, nichrome, tungsten and platinum. Other possible materials for the conductive portion 202 may include a conductive ceramic component such as alumina, silicon carbide, aluminum nitride, silicon nitride or cermet. The insulative portion 204 may, for example, be formed of any thermal plastic or thermal setting polymer materials, such as polycarbonate, polystyrene, or polybutylene terephthalate, or of other high temperature plastics. Other materials that may be employed for the insulative portion 204 include PSF (polysulfone), PEEK (polyetheretherketone), PI (polyimide), PAI (polyamide-imide), PPO (polyphenylene oxide) and PPS (phenylenesulfide). Alternatively, the insulative portion 204 may be formed of rubber or an insulative ceramic. The insulative portion 204 may be formed of two or more different sections (not shown in the drawing), where one of the sections is formed of one of the insulative materials referred to above, and one or more other sections may be respectively formed of one or more other of the insulative materials referred to above. When the lamp 100 is in its assembled condition, the cover 108 (FIG. 1) may be in contact with the insulative portion 204 of the capper component 104.

The capper component 104 may be referred to as "bipartite", where the latter term means that the component is formed of two or more portions each of which is formed of a mutually different material.

The insulative portion 204 may be applied to the conductive portion 202 by processes such as overmolding, injection molding, coating, dipping, casting, computer numerical control (CNC) processes, 3-D printing, insertion molding, double shot molding and welding, for example, or some combination of the foregoing. In forming the insulative portion 204, two or more steps may be performed, including applying one type of insulative material to an outer surface of the insulated section 208 of the conductive portion 202 and a different type of insulative material to an inner surface of the insulated section 208.

In an assembled condition of the lamp 100, the conductive portion 202 of the capper component 104 may be in thermal contact with the heat sink 110. This may promote relatively efficient dissipation of heat in the event of arcing, and may also promote structural rigidity for the lamp 100 as a whole.

Figure 4:
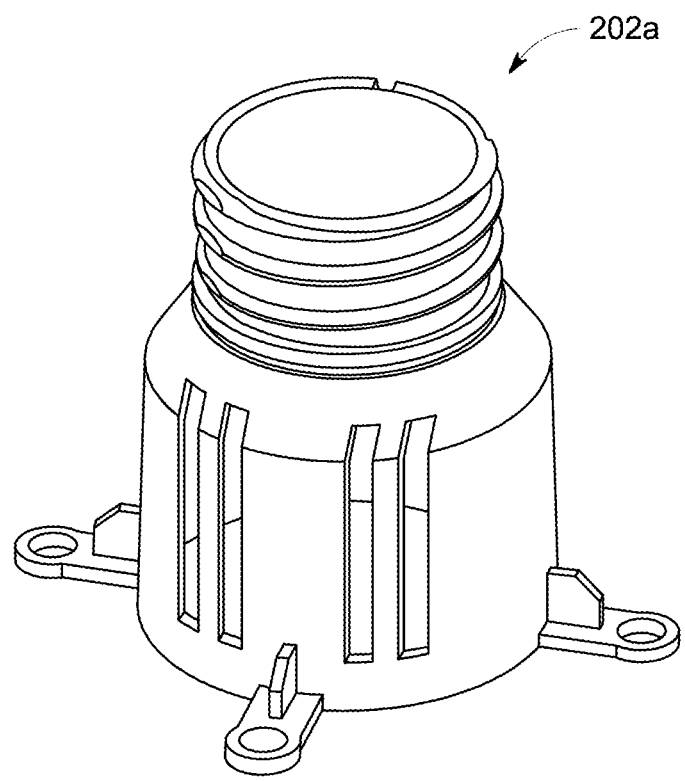
FIGS. 4-6 respectively show alternative embodiments of a conductive portion of the capper component.
Figure 5:
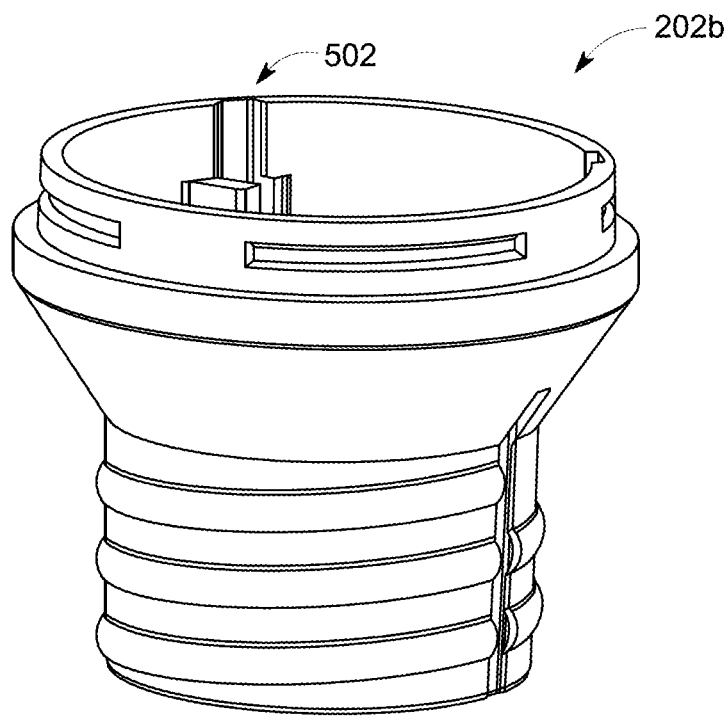
Figure 6:
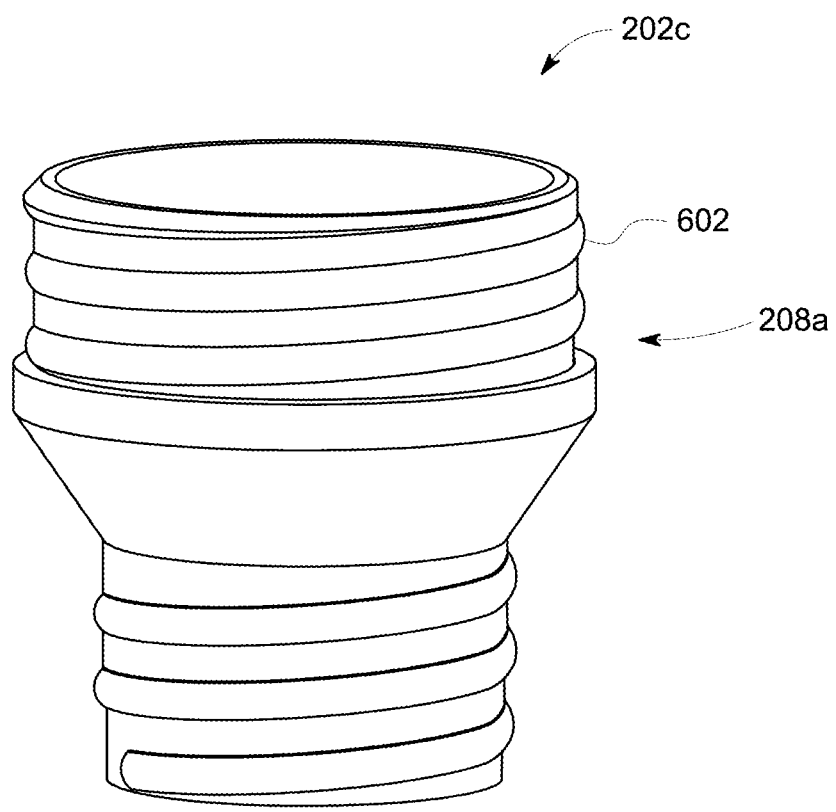

FIGS. 4-6 respectively show alternative embodiments of the conductive portion of the capper component. The alternative embodiments are respectively labeled by reference numerals 202a, 202b and 202c in FIGS. 4-6. The conductive portion 202a shown in FIG. 4 may allow for air flow through the capper component to support active cooling as part of thermal management for the LED retrofit lamp. The embodiments of FIGS. 5 and 6 support alternative modes of applying the insulative portion (not shown in FIGS. 5 and 6) to the conductive portion. In the case of the conductive portion 202b shown in FIG. 5, the insulative portion (not shown) may be attached to the conductive portion 202b by a twist-and-lock feature indicated at 502 as part of the conductive portion 202b. In the case of the conductive portion 202c shown in FIG. 6, the insulative portion (not shown) may be attached to the conductive portion 202c by a screw on configuration (indicated at 602) that forms the insulated section 208a of the conductive portion 202c. With a conductive portion as shown in FIG. 6, at least part of the insulative portion may have a threaded configuration for threadedly engaging (via a screw-on assembly step and not via overmolding) with the threaded configuration of the insulated section 208a of the conductive portion.

Figure 3:
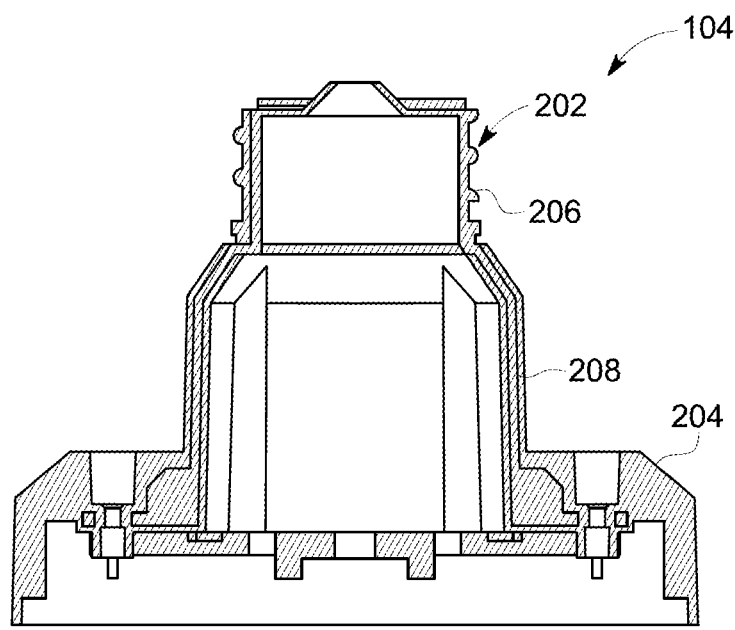
FIG. 3 is a sectional view of the capper component of FIG. 2.
Figure 7:
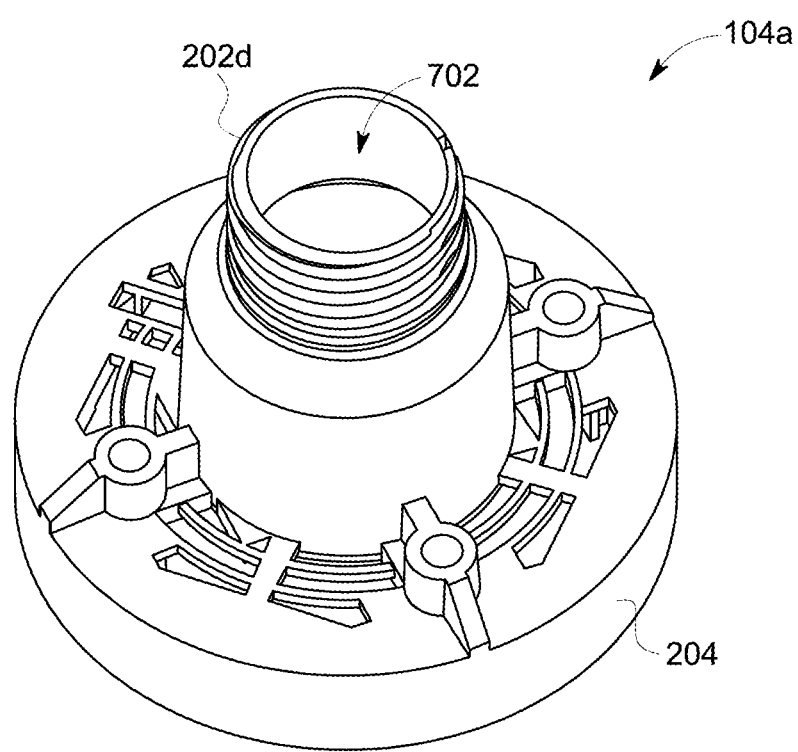
FIG. 7 is an isometric view of an alternative embodiment of the capper component of FIG. 2.

Referring now to FIG. 7, the alternative embodiment (reference numeral 104a) of the capper component shown therein may be the same as the capper component 104 of FIGS. 2 and 3, except that in the capper component 104a of FIG. 7, the conductive portion 202d may be open (as indicated at 702) in the direction toward which the capper component engages with the base 102 (FIG. 1) in the assembled condition of the lamp 100.

In still further embodiments of the capper component, which are not shown, the conductive portion 202 may be modified to incorporate an increased extent of thermal contact between the conductive portion 202 and the heat sink 110 (FIG. 1). In addition or alternatively, the heat sink 110 may be modified for the same purpose.

Figure 8:
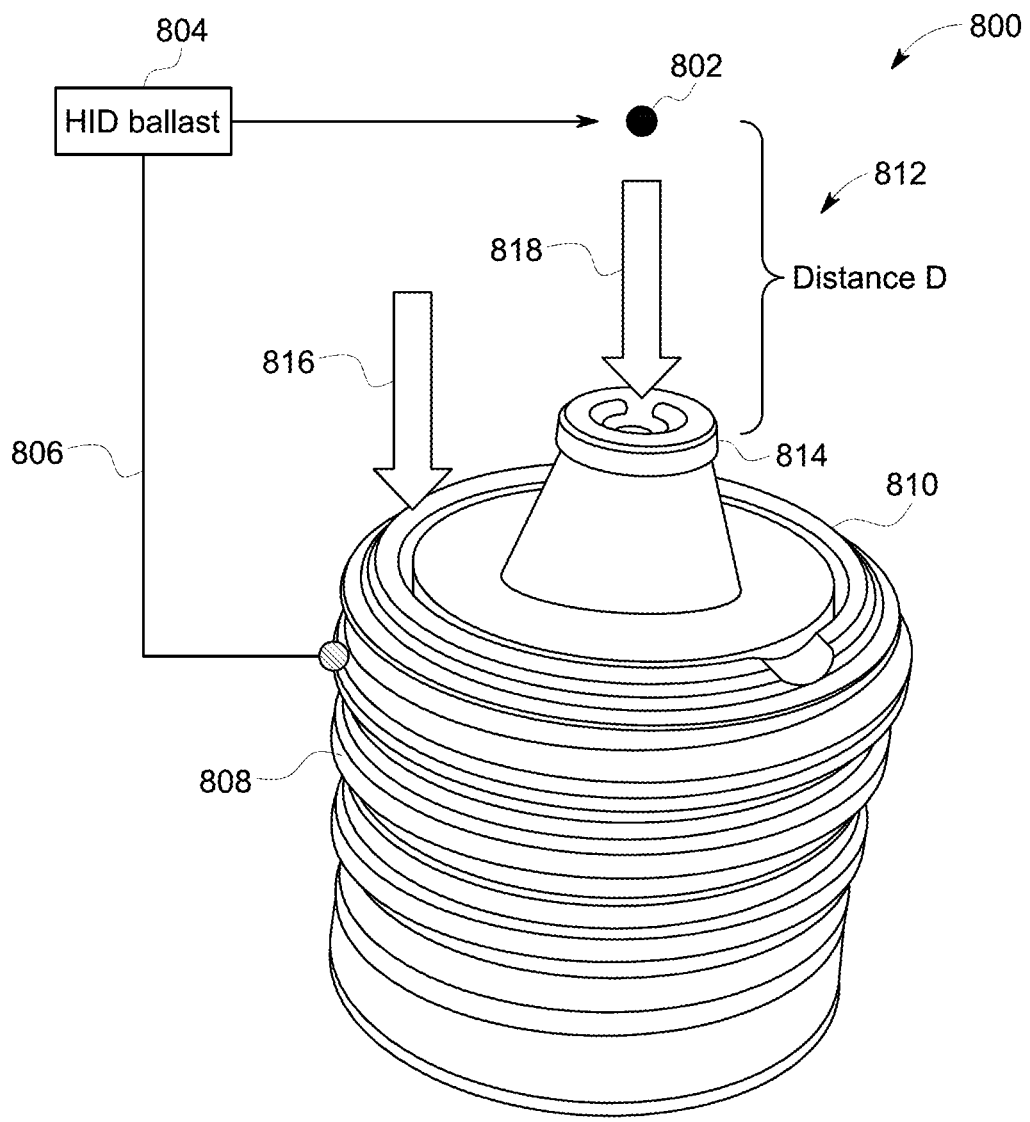
FIG. 8 is a schematic representation of a test set-up for evaluating base arcing in HID lamps.

FIG. 8 is a schematic representation of a test set-up 800 for evaluating base arcing in HID lamps.

The dot 802 in FIG. 8 represents the center tab of the lampholder or socket to which the output of the ballast 804 is attached. The neutral output 806 of the ballast is attached to the shell 808 of the lamp holder and is in direct contact with the base 810, when the lamp is screwed into the lampholder. The set-up equipment allows the center tab distance to be changed (i.e., the distance D—reference numeral 812—from the center tab of the lampholder to the lamp base eyelet 814—can be varied). This simulates the condition when the lamp is not properly screwed in to the lampholder, leaving a gap between the eyelet 814 and the center tab of the lampholder, represented by "(L)". The arrows 816 and 818 represent two locations where the test set-up equipment allows for the proximity of the input power (dot 802) to be varied: From L-B and from L-S. The test set-up equipment forces an arc to be established between the chosen locations, and the distance D can be adjusted, so that the arc may be sustained for as long a time as needed to investigate the effect of various capper component designs.

TABLE 1

| | Test 1 | Test 2 | Test 3 |
|---|---|---|---|
| Capper Material | All Plastic (PBT) | Metal + Plastic | Metal + Plastic |
| Arcing Location | L-S: Ballast output to Shell | L-S: Ballast output to Shell | L-B: Ballast Output to Eyelet |
| Arcing Time | 3.5 mins | 20 mins | 5.5 mins |
| Results | Threads of Plastic Capper melt, Lamp detaches from Lamp Holder | Melting of the Shell of the lamp, Lamp does NOT detach from Lamp Holder | Melting of the Eyelet of the lamp, Lamp does NOT detach from Lamp Holder |

Table 1 above shows results of comparative testing that was performed using a test set-up as illustrated in FIG. 8. Lamps that include an all-plastic capper component were compared with lamps having a bipartite capper component as disclosed herein. It will be noted that with a bipartite capper, the lamp resisted detachment from the lamp holder, whereas the lamp with a plastic capper tended to detach. In view of these test results, it is believed that a bipartite capper component, as described herein, tends to reduce the possibility of structural failure due to arcing in a lamp which incorporates such a capper component.

Figure 9:
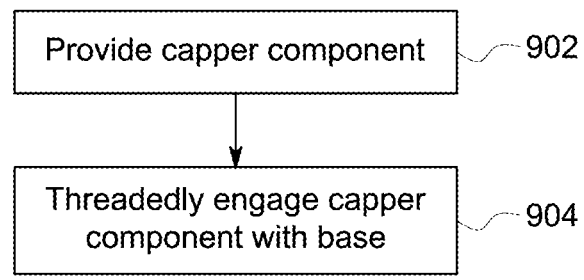
FIG. 9 is a flow chart that illustrates a portion of an assembly process for the lamp illustrated in FIG. 1.

FIG. 9 is a flow chart that illustrates a portion of an assembly process for the lamp 100 illustrated in FIG. 1.

At 902, a capper component as described herein (e.g., the capper component 104 of FIGS. 2 and 3) is provided. At 904, the base 102 is screwed onto the conductive portion 202 of the capper component 104, resulting in the capper component, and particularly the conductive portion thereof, being threadedly engaged with the base 202. Other steps of the assembly of the lamp 100 may, in some embodiments, be in accordance with typical practices for assembling LED retrofit lamps.

While the capper component 202 was described in the context of an LED retrofit lamp, it may also be incorporated in lamps of other types, including HID arc-lamps, compact fluorescent lamps, and incandescent lamps. The base 102 and the conductive portion of the capper component may be dimensioned so as to be suitable for various standard sizes of lamps, as well as for non-standard lamp designs. The base 102 and the conductive portion of the capper component may be configured for use in Edison screw sockets or other types of sockets. The base may be a mogul base or another size of base, and the capper component may be configured accordingly for threaded engagement with the type of base incorporated in the particular embodiment of the lamp.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A capper component for an illuminating lamp, comprising a first portion formed of a first material and a second portion formed of a second material different from the first material, the second portion in contact with the first portion, the first portion configured to threadedly engage within a standard threaded metal base component of the illuminating lamp, wherein the second portion is formed by a forming process on an inner surface of the first portion and an outer surface of the first portion, said second portion touching said inner surface of the first portion and said outer surface of the first portion.

2. The capper component of claim 1, wherein the first material is electrically and thermally conductive and the second portion performs an electrically insulative function relative to the first portion.

3. The capper component of claim 2, wherein the first material is metal or an electrically conductive ceramic.

4. The capper component of claim 3, wherein the first material is aluminum.

5. The capper component of claim 1, wherein the forming process on the inner surface of the first portion and the outer surface of the first portion is selected from the group consisting of overmolding, casting, computer numerical control (CNC) forming, three-dimensional (3-D) printing, insert molding and double-shot molding.

6. The capper component of claim 5, wherein the second portion is formed by overmolding on both of (a) the inner surface of the first portion and (b) the outer surface of the first portion.

7. The capper component of claim 5, wherein the second material is a plastic material, the plastic material selected from the group consisting of PBT (polybutyleneterephthalate), PC (polycarbonate), PS (polystyrene) P SF (polysulfone), PEEK (polyetheretherketone), PI (polyimide), PAI (polyamide-imide), PPO (polyphenylene oxide) and PPS (phenylenesulfide).

8. An illuminating lamp, comprising:
a standard metal base having a threaded configuration;
a capper component having a first portion formed of a first material, the first portion threadedly engaged within the standard metal base, the capper component having a second portion formed of a second material different from the first material, the second portion in contact with the first portion, wherein the second portion is formed by a forming process on an inner surface of the first portion and an outer surface of the first portion, said second portion touching said inner surface of the first portion and said outer surface of the first portion;
a substantially cylindrical plastic cover in contact with the second portion of the capper component;
a heat sink housed within the plastic cover;
a plurality of metal-core printed circuit boards housed within the plastic cover and in contact with the heat sink; and
a plurality of light-emitting diodes (LEDs) mounted on the printed circuit boards.

9. The illuminating lamp of claim 8, wherein the first material is electrically conductive and the second portion performs an electrically insulative function relative to the first portion.

10. The illuminating lamp of claim 9, wherein the first material is metal or an electrically conductive ceramic.

11. The illuminating lamp of claim 10, wherein the first material is aluminum.

12. The illuminating lamp of claim 8, wherein the forming process on the inner surface of the first portion and the outer surface of the first portion us selected from the group consisting of overmolding, casting, computer numerical control (CNC) forming, three-dimensional (3-D) printing, insert molding and double-shot molding.

13. The illuminating lamp of claim 12, wherein the second portion is formed by overmolding on both of (a) the inner surface of the first portion and (b) the outer surface of the first portion.

14. The illuminating lamp of claim 12, wherein the second material is plastic.

\* \* \* \* \*